Figure 1:
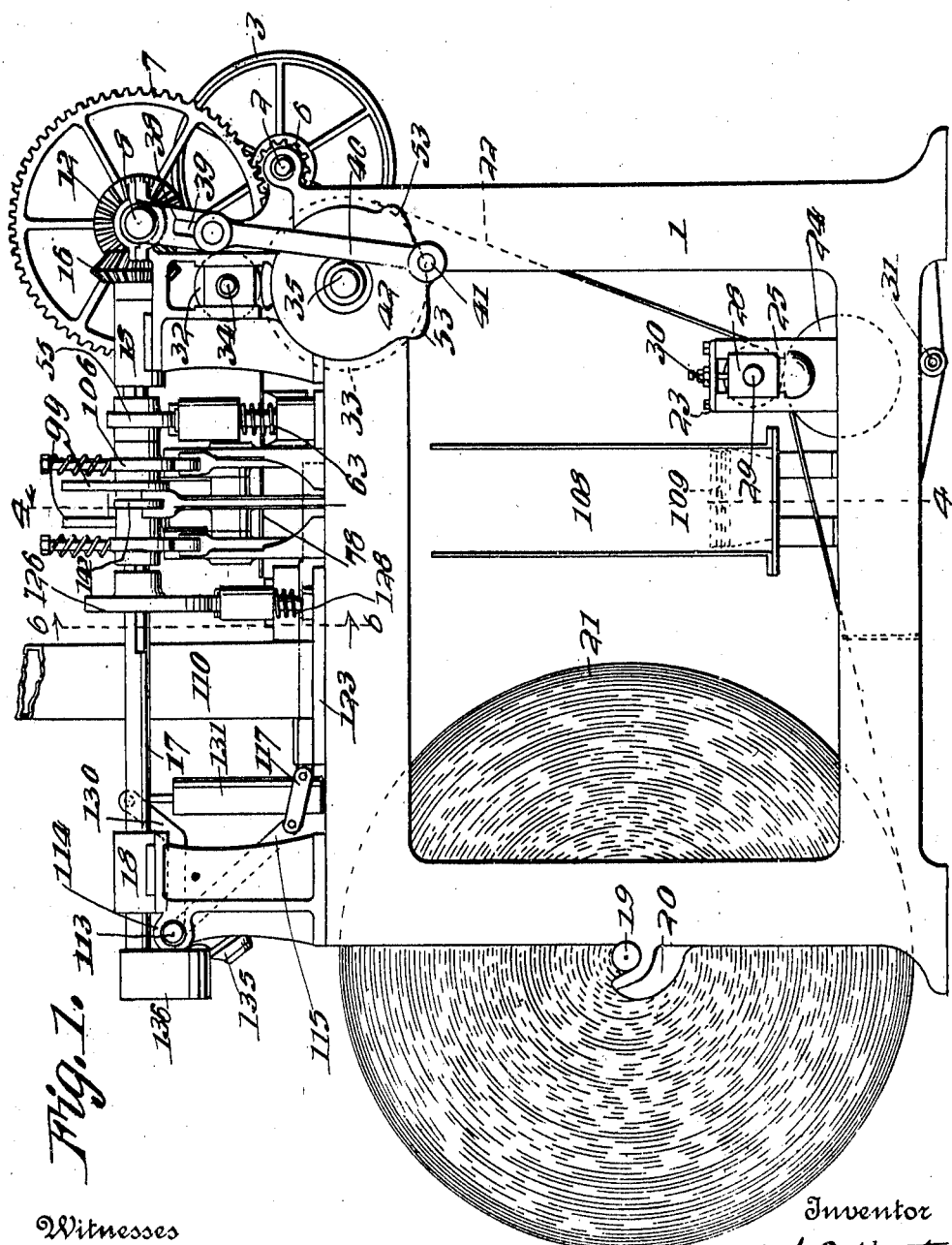

F. E. KUSTER.
TRAY MACHINE.
APPLICATION FILED NOV. 1, 1909.

988,359.

Patented Apr. 4, 1911.
6 SHEETS—SHEET 1.

Witnesses
M. A. Bond
Jas. F. Mansfield

Inventor
Frederick E. Kuster
E. K. Bond
Attorney

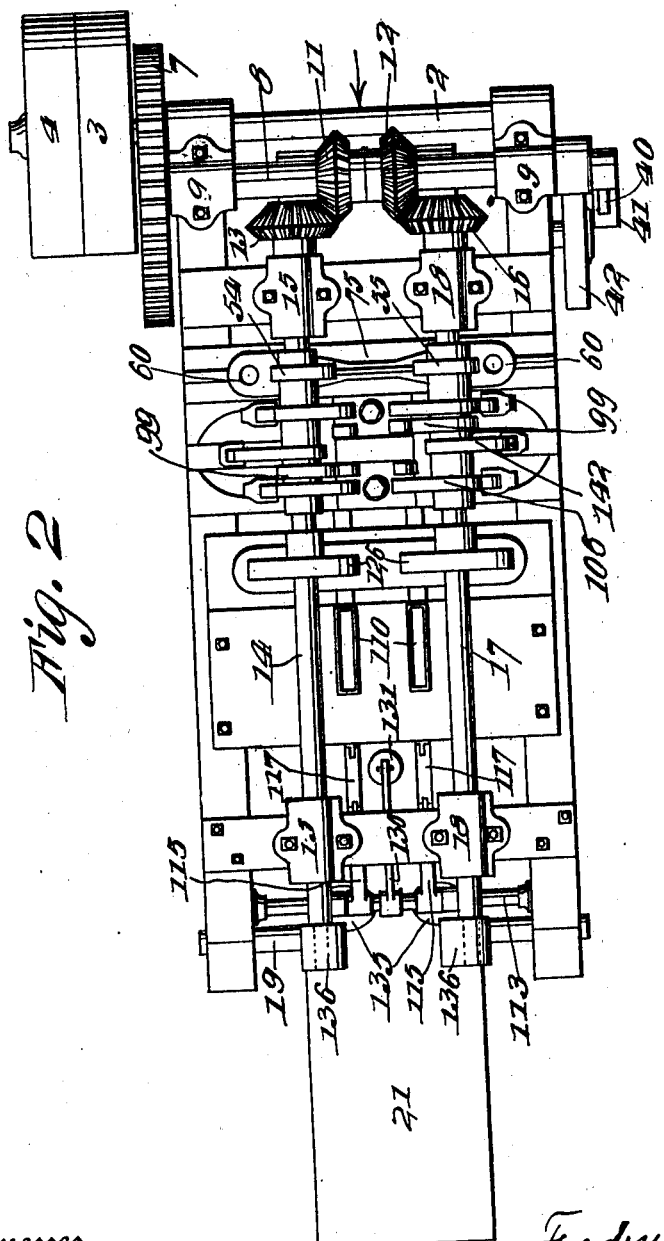

F. E. KUSTER.
TRAY MACHINE.
APPLICATION FILED NOV. 1, 1909.
988,359.
Patented Apr. 4, 1911.
6 SHEETS—SHEET 3.
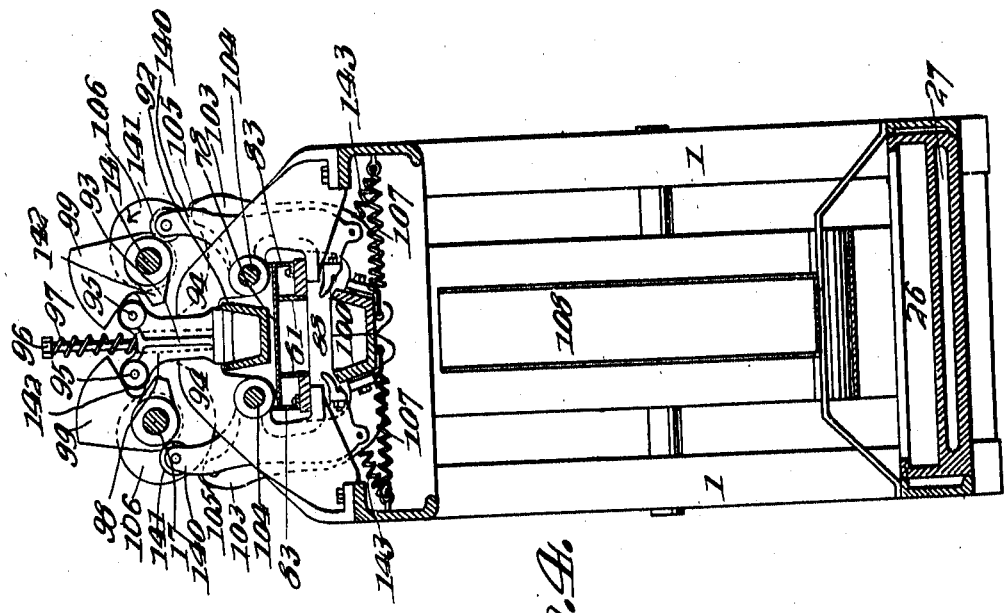
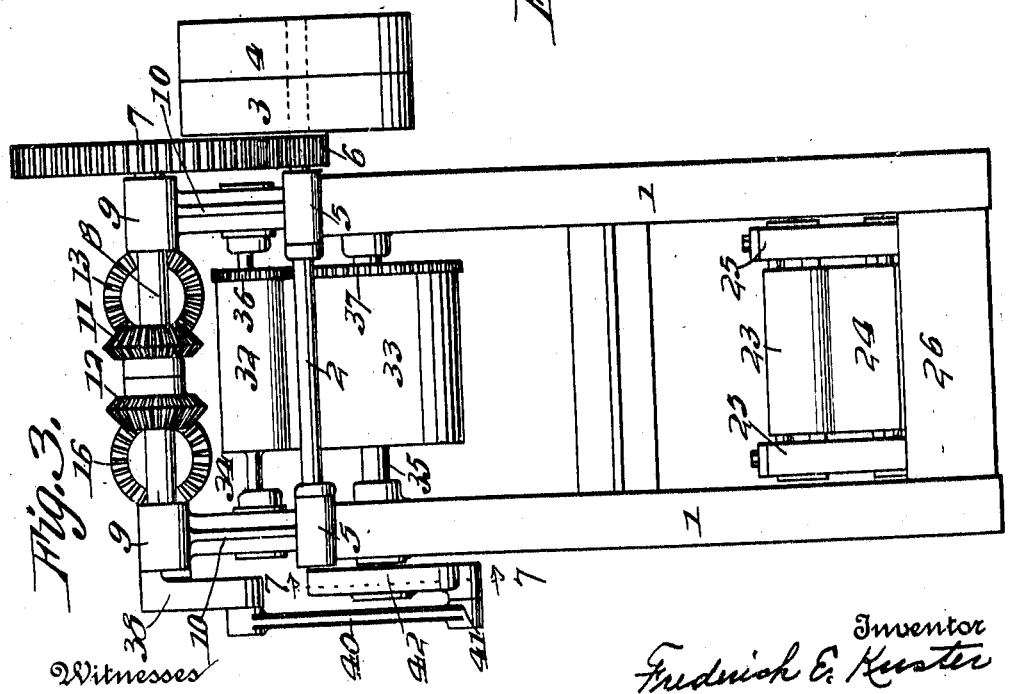
Witnesses
M. A. Bond
Jas. B. Mansfield
Inventor
Frederich E. Kuster
E. H. Bond
Attorney

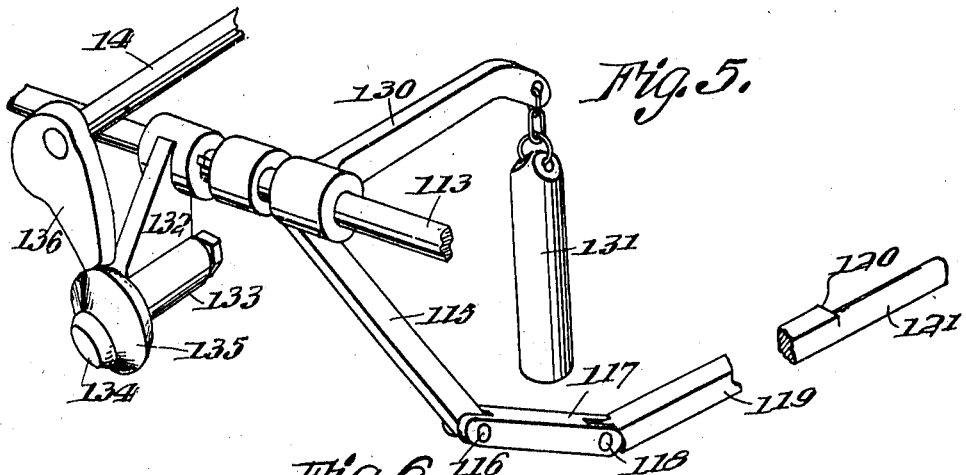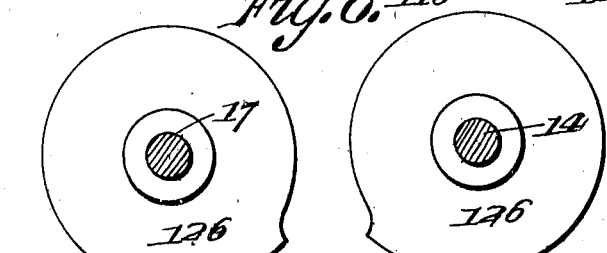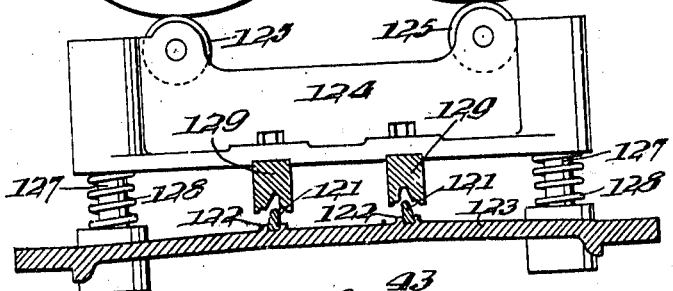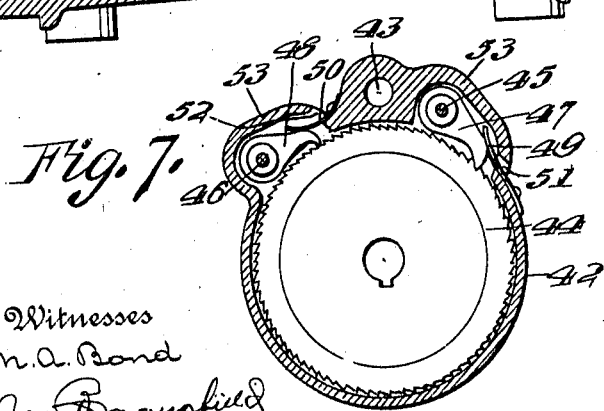

F. E. KUSTER.
TRAY MACHINE.
APPLICATION FILED NOV. 1, 1909.
988,359.
Patented Apr. 4, 1911.
6 SHEETS—SHEET 5.
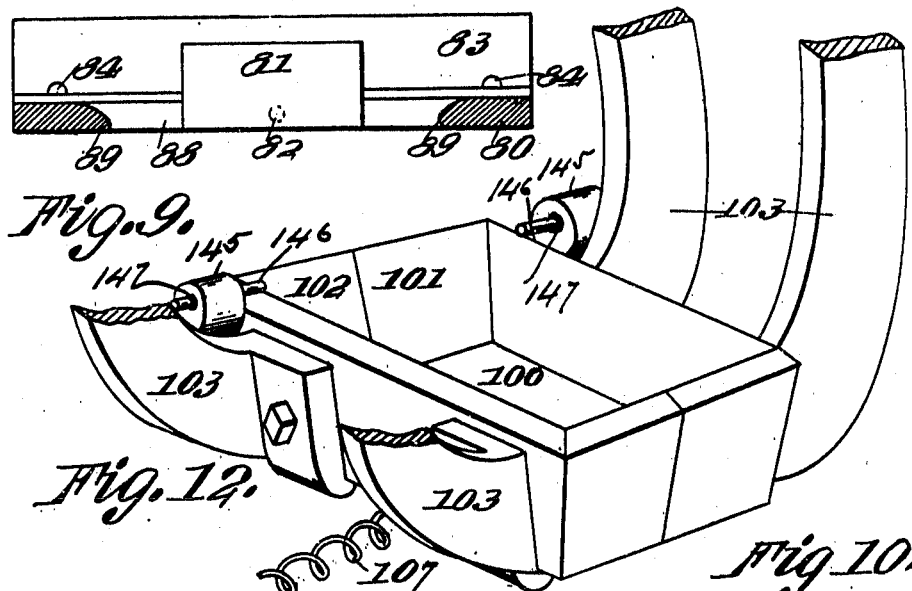
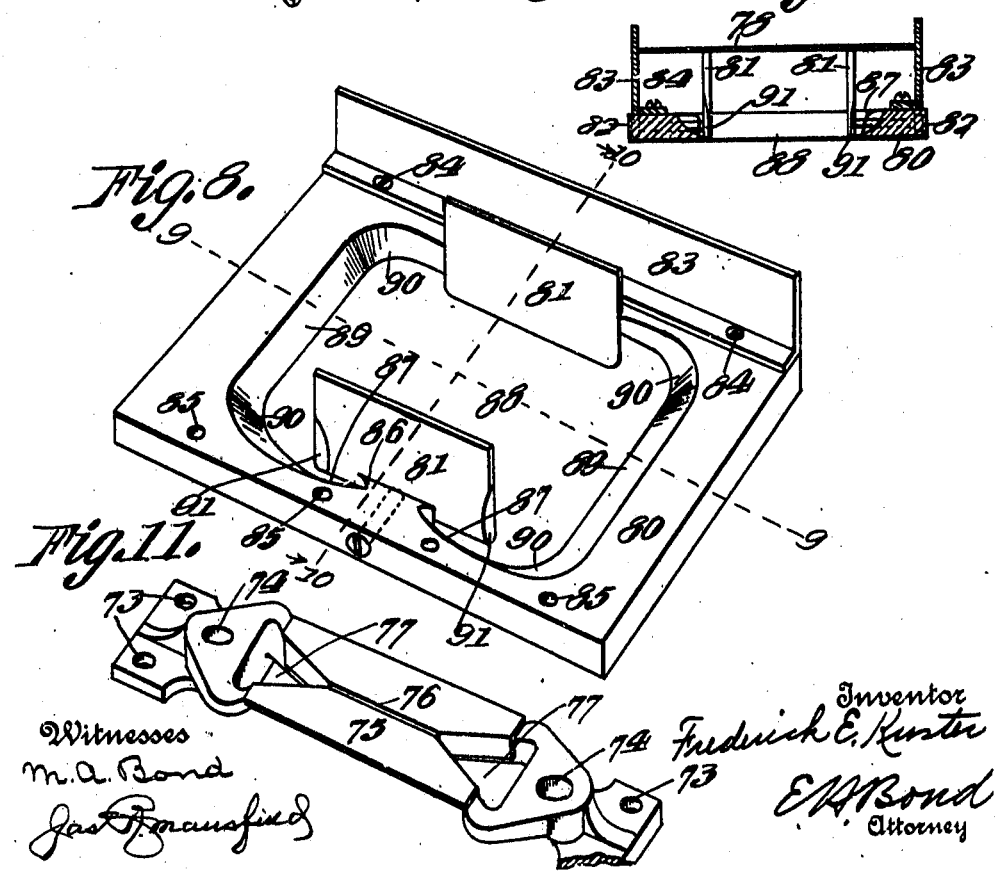
Witnesses
M. A. Bond
Jas. P. Mansfield
Inventor
Frederick E. Kuster
E. H. Bond
Attorney

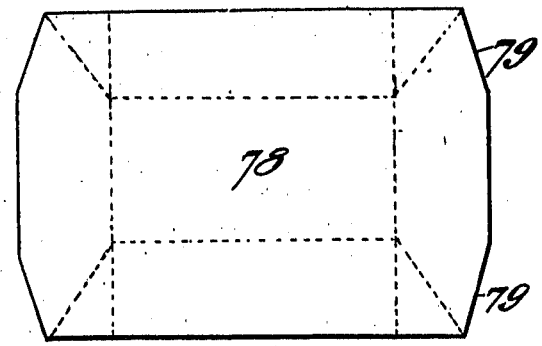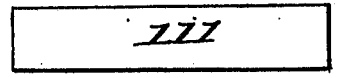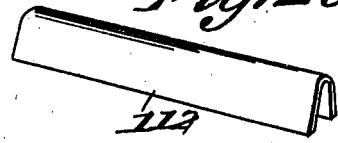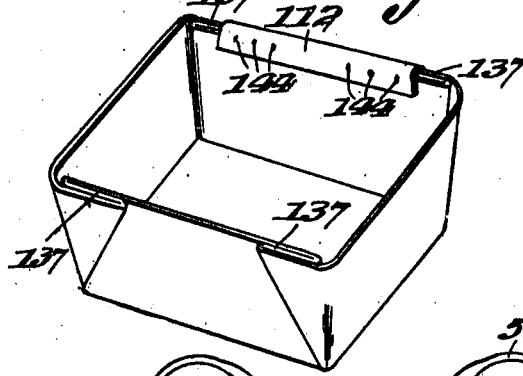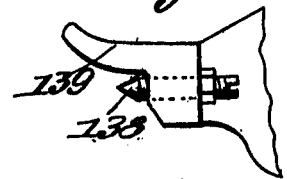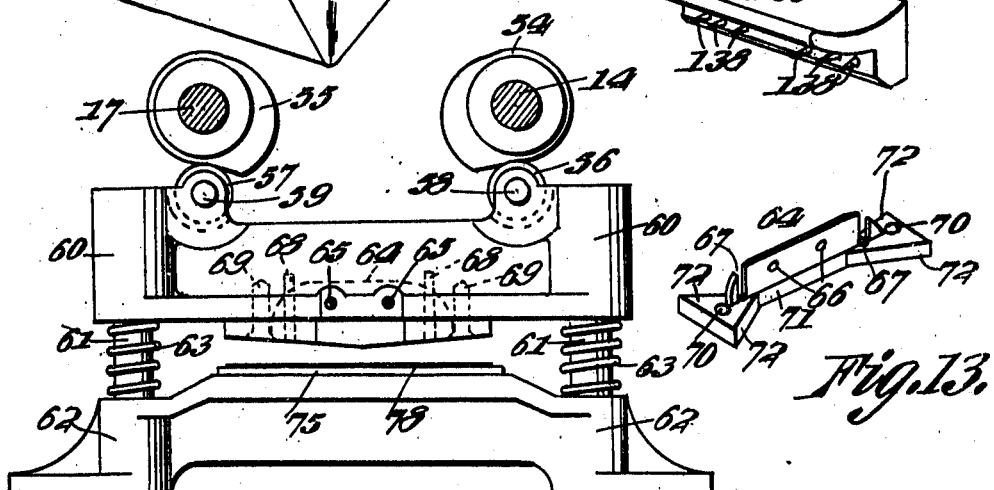

UNITED STATES PATENT OFFICE.

FREDERICK E. KUSTER, OF CEDARTOWN, GEORGIA.

TRAY-MACHINE.

988,359.

Specification of Letters Patent.

Patented Apr. 4, 1911.

Application filed November 1, 1909. Serial No. 525,788.

*To all whom it may concern:*

Be it known that I, FREDERICK E. KUSTER, a citizen of the United States of America, and resident of Cedartown, in the county of Polk and State of Georgia, have invented certain new and useful Improvements in Tray-Machines, of which the following is a specification.

This invention relates to certain new and useful improvements in machines for making trays of paper or analogous material, of that type designed for use for butter, lard, pickles and many other articles.

The present invention has for its objects among others to provide a simplified, yet durable and efficient machine for making articles of this character whereby the cost of production is materially lessened, while at the same time the character of the tray is improved.

It has for a further object to provide a machine for this purpose whereby the tray is completed ready for use in the one and the same machine.

It has for a further object to provide a machine of this general nature by which and in which the operation is continuous from the time of feeding in the blank or strip from which the tray is formed until it is delivered complete from the machine, either with or without a protecting-strip or strips at the upper edge or edges of the tray.

I provide a machine by which the strips or blanks from which the trays are formed do not require to be scored or creased as a preliminary step to the formation of the tray. By my machine the blanks or strips are fed in unscored and uncreased and the forming mechanism operates thereupon to form the completed tray, and, by this means, I produce a tray that is stronger not only at the corners but as a whole. The machine, however, will operate equally as well upon strips which have been scored or creased, should, for any reason, it be desired to employ such form of strips or blanks.

I aim further at improvements in the machine as a whole and in the details of construction whereby the parts are timed to operate in sequence and ease of operation is attained.

Other objects and advantages of the invention will hereinafter appear and the novel features thereof will be particularly pointed out in the appended claims.

The invention is clearly illustrated in the accompanying drawings, which, with the numerals of reference marked thereon, form a part of this specification, and in which—

Figure 1 is a side elevation of a tray forming machine constructed in accordance with my invention with a portion broken away. Fig. 2 is a top plan. Fig. 3 is an end elevation, looking in the direction of the arrow in Fig. 2. Fig. 4 is a vertical cross section on the line 4—4 of Fig. 1, with portions removed. Fig. 5 is an enlarged perspective detail of the protecting-strip feed mechanism. Fig. 6 is an enlarged vertical cross section on the line 6—6 of Fig. 1, looking in the direction of the arrow, with portions to the right removed. Fig. 7 is an enlarged vertical cross section on the line 7—7 of Fig. 3. Fig. 8 is an enlarged perspective view of the former. Fig. 9 is a vertical longitudinal section through the same, as upon the line 9—9 of said Fig. 8. Fig. 10 is a vertical cross section on the line 10—10 of Fig. 8. Fig. 11 is an enlarged perspective view of the lower die. Fig. 12 is an enlarged perspective view of the separable former with its supports broken away. Fig. 13 is a perspective of the upper die. Fig. 14 is an enlarged end elevation of the paper severing dies. Fig. 15 is an enlarged perspective view of the protecting strip affixing member. Fig. 16 is an end elevation of the same with the member by which it is supported broken away. Fig. 17 is a plan view of the blank or strip from which the tray is formed, the dotted lines indicating the lines upon which the same is folded by the former and plunger. Fig. 18 is a perspective view of a tray showing a protecting strip upon one edge. Fig. 19 is a view of one of the protecting strips before it has been operated upon by the bending mechanism. Fig. 20 is an enlarged perspective view of one of the protecting strips prior to its application to the upper edge of the tray.

Like numerals of reference indicate like parts in the several views.

Referring to the drawings, 1 designates the frame of the machine, of any suitable character capable of supporting the working parts hereinafter described.

Journaled in suitable bearings, in this instance, shown as near the upper end of the frame 1, is a transverse shaft 2, at one end of the machine and upon this shaft are the fast and loose belt pulleys 3 and 4. The bearings 5 may be of any suitable nature and supported upon the frame in any of the well-known ways.

6 is a gear wheel on the shaft 2 meshing with a large gear 7 on a transverse shaft 8 mounted in suitable bearings 9 at the upper ends of the standards 10 rising from the frame 1. Fast upon the shaft 8 are the bevel pinions 11 and 12, the former meshing with a bevel pinion 13 on a longitudinal shaft 14 mounted in suitable bearings 15 on the frame 1. The bevel pinion 12 meshes with a bevel pinion 16 on the longitudinal shaft 17 parallel with the shaft 14 and mounted in suitable bearings 18 upon the frame, as seen clearly in Fig. 2. These parallel shafts 14 and 17 serve to actuate members which will soon be described.

The machine is adapted to operate upon either single strips fed thereinto in any suitable manner, or upon an endless web, it being shown in the present instance as operating upon the latter.

19 is the shaft or spindle mounted in suitable brackets or supports 20 at the rear end of the frame of the machine and which carries the roll of paper 21, from which the trays are formed. From the roll, unwinding from either the upper or lower side thereof, in this instance shown as unwinding from the lower side, the paper 22 passes between rollers 23 and 24 carried by shafts mounted in suitable bearings in standards or supports 25 rising from the base of the machine, as seen in Fig. 1. The roller 24 revolves in a pan or receptacle 26 designed to contain paraffin or analogous material (when the paper employed is to be paraffined in its passage from the roll to the forming mechanism), the paraffin receptacle being provided with a steam jacket 27, as seen clearly in Fig. 4, so that, by the introduction of steam, the paraffin is kept at the proper consistency. The shaft of the top roll 23 is rendered adjustable in any suitable manner, as seen, for instance, in Fig. 1, to accommodate it to the different thicknesses of paper or material being acted upon, the bearing 28 for the shaft 29 of said upper roller being shown, in this instance, as adjustable by means of set screws 30 and jam nuts, as will be evident from Fig. 1. Steam is supplied to the steam jacket through suitable supply 31, seen in Fig. 1.

After passing through between the rollers 23 and 24 and being coated or impregnated with paraffin or analogous material in a well-known manner, the paper passes upward, as seen clearly in Fig. 1, and between the feed rollers 32 and 33, as indicated in Fig. 1. These feed rollers are carried by shafts 34 and 35 respectively mounted in suitable bearings in the frame of the machine and are geared together by means of the gears 36 and 37, as seen in Fig. 3, for a well-known purpose. These feed rollers are actuated in the following manner from the shaft 8. Fast on the shaft 8 is a crank 38 provided with a longitudinal slot 39 for adjustment of the pitman 40, which is connected therewith at one end in any well-known manner, said pitman being connected at its other end, as at 41, with the casing 42, which is provided with an opening 43 for the reception of said connection, such opening being shown clearly in Fig. 7. 44 is a ratchet wheel fast upon the shaft 35 within the casing 42. Pivotally mounted, as at 45 and 46 respectively, within the casing and movable therewith, are the pawls 47 and 48 respectively, which are adapted to engage with the teeth of the ratchet 44 upon opposite sides of the connection 41. Springs 49 and 50, secured to the casing and working through slots 51 and 52 therein, act upon the free ends of the pawls and serve to keep them normally in engagement with the teeth of the ratchet. These pawls are mounted or housed in suitable housings formed by enlargements 53 on the adjacent portion of the casing, as seen clearly in Figs. 1 and 7.

From the above, when taken in connection with Figs. 1, 3 and 7, it will be evident that as the shaft 8 is revolved, rotary motion is imparted to the shaft 35 and, consequently, to the feed roller 33 and, through the medium of the gears 36 and 37, rotary motion is imparted to the feed roll 32, so that the paper is fed through between the rollers to the mechanism which will now be described. This feed of the paper is intermittent and the parts are so constructed and relatively arranged and timed that the paper is fed at each actuation of the pitman 40 a predetermined distance which is just sufficient to bring the requisite amount of paper to form a tray, over the forming mechanism. Then there is a rest, during which time the forming mechanism is actuated so that the tray is formed and removed from the formers and the parts restored to their normal position before the feed mechanism again acts to feed forward another strip of paper, and this operation is repeated as long as the machine is in operation.

On the shafts 14 and 17 are cams 54 and 55 respectively, which are designed to operate upon rollers 56 and 57 carried by shafts 58 and 59 respectively, said shafts being in vertical alinement below the shafts 14 and 17, as seen best in Fig. 14. These rollers are mounted in suitable bearings in a frame 60, which constitutes the vertical movable support for the upper die. This frame 60 is mounted upon the guide posts or standards 61 adapted for reciprocation within the lower portion 62 and around which guides are the springs 63 which serve normally to keep the frame 60 and the upper die in its uppermost position but which are compressed as the upper frame 60 is moved downward by engagement of the cams 54 and 55 with the rollers 56 and 57 thereon, as will be evident from Fig. 14. The lower portion of the frame 60 is provided with a slot within which is received the central vertical portion 64 of the upper die, the dotted lines in Fig. 14 showing the portion 64 in position where it is secured by suitable means, as screws or the like 65, passing through openings 66 in said portion 64 for such purpose. Openings 67 in this upper die receive dowel pins 68, as indicated by dotted lines in Fig. 14 to better steady the die and prevent undue movement thereof. Screws or the like 69, passed through openings 70 at the ends of the upper die, serve to firmly secure it in place. The shape of the acting portion of this die is seen best in Fig. 13 wherein it will be seen that the central portion is straight, as at 71, and the end portions are inclined, as at 72, upon opposite sides and at opposite ends, so as to give the desired shape to the blank when the latter is operated upon by said die. The lower or coöperating die is secured to the lower frame 62 in any suitable manner, as by screws or bolts passed through openings 73 in the ends thereof, said lower die being provided adjacent its ends with openings 74, through which the guides 61, hereinbefore described, are designed to reciprocate. The body portion 75 of this lower die is provided with a central longitudinal slit 76, for the passage of the straight portion 71 of the upper die and with triangular passages 77, for the rception of the triangular end portions of the upper die, as is seen best in Fig. 11. The parts are so timed that, after the paper has been fed through the machine to the extent above described and as illustrated in Fig. 1 wherein 78 designates the blank thus fed in position to be cut, the cams 54 and 55 are actuated, during the interval of rest above referred to, to act upon the rollers 56 and 57 and force the upper die down through the paper and into the lower die, so that the end of the paper is given a configuration seen in Fig. 17, it being noted that the corners are inclined, as seen at 79. The formation of the die is such that at each reciprocation thereof, the paper is so cut as to give this configuration to the end of the paper, from which the next tray is to be formed, as well as to the adjacent end of the next strip, it being evident that only a small V-shaped piece of paper is removed from each side of each strip or blank at each reciprocation of the die. As soon as the paper is cut, it is operated upon by the forming mechanism, which will now be described.

Referring first to Fig. 8, 80 designates the former. This is supported in position just beyond the severing die just described, and, as the paper is fed between the feed rollers, it is fed to and supported upon the side plates 81 which project upwardly from opposite sides of the former 80, being secured thereto in any suitable manner, preferably removably, as by the screws or like means 82, whereby they may be removed or interchanged whenever desired. 83 are guide plates between which the paper is guided in its movements. They rise from opposite sides of the former 80, as seen in Fig. 8, and are removably supported in position in any suitable manner, as by screws 84 engaging openings 85 in the former; one of these plates is shown as removed in Fig. 8 for the sake of clearness. As shown in Fig. 8, the plates 81 are supported upon the inward projections 86 on the sides of the former, and behind these plates are the recesses 87 into which the overlapped end portions of the paper are received and compressed. The opposite walls of the ends of the opening 88 of the former are convex, as seen at 89 in Fig. 9, the corners of said opening being rounded, as shown at 90, in order to give the proper configuration to the paper as it is being shaped by the plunger in its passage through the opening in the former. The ends of the vertical plates 81, upon the lower sides thereof, are chamfered or beveled, as seen at 91, so as to leave a very thin edge at that point, so that the overlapped folds will be folded down sharply and closely, avoiding the necessity of after-pressing. Fig. 4 shows the blank 78 resting on the vertical pieces 81 and between the guides 83.

92 is the plunger. It is fitted and shaped for coöperation with the former 80 and is carried by the vertical support or member 93, which is guided in the members 94 rising from the upper part of the frame. It is provided, upon opposite sides of its center, with anti-friction rollers 95.

96 are guide rods or stems movable with the plunger and around these stems are springs 97 which find a resistance against a fixed member 98 and which are adapted to be compressed as the plunger is moved downward and serve to automatically return the plunger to its normal position after it has ceased to be acted upon by the cams provided for such purpose. These cams 99 are fast on the shafts 14 and 17, as seen in Figs. 1, 2 and 4, and are so timed in their movement as to operate upon the anti-friction rollers to depress the plunger as soon as the upper die has severed the blank from the strip, or has formed the end of the blank in a manner which has just been described.

100 is a separable receiving former. It is disposed directly beneath the opening 88 in the former 80 and in alinement with the plunger 92, as will be clearly understood upon reference to Fig. 4, in which the parts are seen in their relative positions. This receiving former 100 is formed of two like parts 101 and 102. These parts are designed to abut along the longitudinal central line of the said member, each part being carried by an arm or arms 103, attached thereto in any suitable manner, upon the under sides of the said parts, the arm or arms 103 being pivotally mounted upon the rods or shafts 104, which are suitably supported in the frame, as seen clearly in Fig. 4. These arms 103 have upward extensions projecting beyond their pivots and their extreme upper ends are provided with antifriction rollers 105, with which are adapted to coöperate cams 106 upon the shafts 14 and 17 respectively.

107 are springs attached one to each half of the separable former and to adjacent portions of the frame, as seen best in Fig. 4. These springs serve to open the members of the frame to allow of the removal of the completed tray, while the cams above-mentioned serve to force the said parts together and hold them while the plunger is compressing the paper into the said former. Beneath the former 100, in vertical alinement therewith and adapted to receive the completed trays as they are dropped from said former, is a vertically disposed hopper or receptacle 108 into which the completed trays fall one within the other, as indicated at 109 by dotted lines in Fig. 1. This receptacle is open upon one side and the trays can be removed therefrom at will. The supports 94 serve to maintain in proper position the former 80, the shafts or rods 104 and the other operating parts, as will be seen clearly in Fig. 4.

With the parts constructed and arranged substantially as above described and illustrated, the operation will be apparent, especially when taken in connection with the annexed drawings. Briefly stated, it is as follows. The roll of paper 21, being in position and the end thereof passed through between the rollers 23 and 24 by which it is supplied with paraffin, and the free end of the roll of paper passed between the feed rolls 32 and 33 and the machine started, the paper is fed through the rolls into the position in which it is seen in Fig. 1, where it rests upon the vertical members 81 of the stationary former 80. As soon as the feeding operation is concluded, the upper die is operated to sever the paper. Then the plunger descends and forces the paper through the former 80 and into the receiving former 100; then the spring 97 returns the plunger to its normal position, that in which it is seen in Fig. 4, and then the cams 106, which have been holding the two parts of the former 100 together, have passed to a position where they no longer operate upon the rollers 105, when the springs 107 pull the two halves of the former 100 apart and the completed tray drops into the receptacle 108. By this time, another sheet of paper or blank is being fed through the machine and the above-named operations are repeated. The parts are all nicely timed so as to act in rapid succession, yet the one step is completed before another is taken up.

When the machine is used to operate upon blanks which have already been severed, the roll of paper 21 is dispensed with and the blanks are fed in through the feed rollers 32 and 33, by hand, or in any other suitable manner, in the same way that the strip from the roll is fed, as above described. The upper die, in connection with the lower die, serves to give the proper formation to the end of the blank and the succeeding operations are as before. When the blanks are thus fed, they are, of course, not passed through the paraffin-applying mechanism, the blanks having been previously paraffined, or being of such nature as not to require such treatment.

In order to adapt the machine to apply protecting strips to the upper edges of the tray, when desired, I have equipped the machine with the mechanism now to be described, it being understood that if such protecting strips are not to be applied, this mechanism may be omitted or may be rendered inactive and not used. These protecting strips may be of any desired nature and material. They may be fed to the machine from a continuous roll, similar to the roll of paper 21 above described, or they may be fed to the machine in separated strips. The latter form will now be described. For this purpose, I employ two hoppers 110, seen in Fig. 2, which are disposed in longitudinal alinement with the opposite sides of the completed tray. Into these hoppers are placed strips, such as seen at 111 in Fig. 19. These strips are, by the mechanism now to be described, bent into substantially the form seen at 112 in Fig. 20. In order to feed the strips from the hoppers, I provide means, seen best in Figs. 1 and 5.

113 is a shaft mounted in suitable bearings 114 at the rear end of the machine, and upon this shaft are two arms 115, only one of which is shown in Fig. 5, and to the forward end of each shaft is jointed, as at 116, a link 117, the forward end of which is jointed, as at 118, to a pusher 119. This pusher has a shoulder 120 and beyond said shoulder, it is formed with a portion 121 which, in cross section, is substantially the same as that of the shape which it is desired to give to the strip 112, as seen in Fig. 20. The portions 121 are guided in suitable correspondingly shaped guides 122 in the upper face of a plate 123 supported upon the frame 1 and upon which the hoppers rest.

124 is a movable frame provided with the anti-friction rollers 125, with which are adapted to engage the cams 126 on the shafts 14 and 17. This frame 124 is mounted for vertical reciprocation, being guided by suitable guides 127, around which are the springs 128, which latter are compressed as the frame is forced downward and which serve to automatically return the frame to its uppermost position, after the cams 126 have ceased to act. This frame 124 carries the female dies 129 for coöperation with the portions 121 when the latter are in proper position.

130 is an arm fast upon the shaft 113 and carrying at its free end a weight 131, which may be suspended therefrom in any well-known way.

132 is a plate or bracket keyed to the shaft 113 and having at its lower end a bearing 133 for a shaft 134, on which is a beveled roller 135. Fast on each of the shafts 14 and 17, at the rear end of the machine, is a cam 136, each cam being designed for coöperation with a roller 135.

In operation, the revolution of the shafts 14 and 17 causes the cams 136 at proper intervals to contact with the rollers 135 and rock the shaft 113. As the shaft is rocked, the arms 130, with their weights, are raised and the arms 115, with their links 117 and pushers 119, are forced forward into openings formed in the bottoms of the hoppers 110. As the shoulder 120 on a pusher comes in contact with the lowermost strip 111 in the hopper, the further movement of the pusher removes the same from beneath the hopper and the pusher takes the same to a position where said strip and the portion 121 is directly beneath the female die 129. At this time, the cams 126 are actuated, so as to force downward the frame 124 and the female dies, so that the strips 111 are bent into the form seen in Fig. 20 at 112. There is an interval of rest just at this time, but, as soon as the cams 126 have ceased to act and the springs 128 force the frame 124 upward, so that the female dies 129 are elevated into the position in which they are seen in Fig. 6, the pushers 119 are again moved forward and the bent strips are brought over the top edges of the completed tray. The pushers then recede, dropping the bent strips 112 upon the upper edges of the tray. The strips are of sufficient length to engage the overlapped joints 137 of the tray, so as to embrace the same and hold them firmly in their compressed condition.

When metal protecting strips are employed, I provide the means seen in Figs. 4, 15 and 16 for indenting such strips, so as to secure them to the upper edges of the tray. These indenting means may be of any suitable form. In Fig. 16, I have shown them as pointed screw-threaded members 138, which are adjustable in their support 139, so as to adapt them to different thicknesses of protecting strips. In order to automatically actuate these devices at the proper time, I mount them upon swinging supports 140, which are pivotally mounted on the rods 104, and, at their upper ends, carry anti-friction rollers 141, which are designed to be acted upon at proper times by the cams 142, carried by the shafts 14 and 17 respectively. Suitable springs 143 are provided, as seen in Fig. 4, one end being attached to the lower end of each of the members 140, and the other ends to some fixed part of the frame. At proper intervals, after the strips 112 have been placed in position upon the upper edges of the tray, these cams come into operation, so as to force the pointed members 138 through the strips, making the indentations 144, as seen in Fig. 18, which serve to secure the protecting strips to the tray in a manner which will be readily understood. In Fig. 15, I have shown six of these pointed members 138, three designed to act upon each end of the protecting strip, but it is evident that this number is immaterial and that a greater or less number of these points may be employed. The supporting members 139, which carry the pointed members 138, serve an additional function. As the said members are brought toward the tray, in order to puncture the strips, these members, which, as will be seen in Figs. 4, 15 and 16, are somewhat upwardly curved toward each other, come into engagement with the upper bent edges of the protecting strips and force them down firmly into position upon the upper edges of the tray and hold them very rigidly while they are being punched by the pointed members 138. After this operation has been performed, the cams move out of operative position and the springs 143 return the members 140 to their normal position, that shown in Fig. 4, where they remain until another set of protecting strips has been placed in position, when, in due course of time, they can operate to secure said strips.

Referring to Fig. 12, there will be seen pins 146 mounted for endwise movement in lugs or bearings 145 and acted upon by springs 147. These pins recede to allow the protecting strips to pass and then fly back again through the medium of their springs, so as to engage the rear ends of the strips and prevent the latter from being moved back with the pusher.

While I have shown the machine as constructed to make but one form and size of tray, it is evident that the same is adapted for forming any different size, all that is necessary to do being to remove the formers and plunger and substitute therefor similar members of different size. Other means may be employed for primarily forming the tray or giving it its shape without materially affecting the working of the other parts or departing from the general organization thereof.

From the above, it will be seen that I have devised a simple and efficient, properly timed, machine, whereby trays can be formed economically, expeditiously and rapidly, and, while the structural embodiment of the invention as hereinbefore disclosed is what I, at the present time, consider preferable, it is evident that the same is subject to changes, variations, and modifications in details, proportion of parts, etc., and I, therefore, do not intend to restrict myself to the exact construction, proportions, arrangement of parts, etc., as hereinbefore set forth, but reserve the right to make such changes, variations and modifications as come properly within the scope of the protection prayed.

It is deemed important that the sections of the former 100 be pivoted so as to move laterally and downwardly to allow of the release of the tray. By this means I economize space and am enabled to actuate the sections of the former without interfering with the means which I employ for affixing the binding or protecting strip to the upper edges of the trays.

What is claimed as new is:—

1. In a tray machine, an upper former, a tray-receiving former beneath the same, a plunger coöperating with both formers, and means for applying binding strips to the tray while in the tray-receiving former.

2. In an organized machine for making trays, a sectional former having portions to extend beneath and positively support the tray, a plunger in vertical alinement with said former, means for moving the sections of said former laterally after the tray is formed to release the tray, and a former interposed between the plunger and the sectional former.

3. In an organized machine for making trays, a sectional former having portions to extend beneath and positively support the tray, a plunger in vertical alinement with said former, means for moving the sections of said former laterally after the tray is formed to release the tray, and a former interposed between the plunger and the sectional former, and having vertically disposed plates for receiving and supporting the blank.

4. In an organized machine for making trays, a sectional former having portions to extend beneath and positively support the tray, a plunger in vertical alinement with said former, means for moving the sections of said former laterally after the tray is formed to release the tray, and a former interposed between the plunger and the sectional former, and having vertically disposed plates for receiving and supporting the blank, said plates having their lower edges chamfered.

5. In an organized machine for making trays, a sectional former having portions to extend beneath and positively support the tray, a plunger in vertical alinement with said former, means for moving the sections of said former laterally after the tray is formed to release the tray, and a former interposed between the plunger and the sectional former and having vertically disposed plates for receiving and supporting the blank, said plates having their outer edges chamfered, there being corner receiving recesses between said plates and the adjacent walls of the former.

6. In an organized machine for forming trays, means for feeding the material, means for shaping an end thereof, means for giving shape to the tray, a former into which the shaped tray is forced downward, said former being in sections and having portions to extend beneath and positively support the tray, and means for moving said sections laterally after the tray is formed to release the tray.

7. In an organized machine for forming trays, means for feeding the material, means for shaping an end thereof, means for giving shape to the tray, a former into which the shaped tray is forced downward, said former being in sections and having portions to extend beneath and positively support the tray, means for moving said sections laterally after the tray is formed to release the tray, and means for automatically closing said sections.

8. In an organized machine for forming trays, means for feeding the material, means for shaping an end thereof, means for giving shape to the tray, a former into which the shaped tray is forced downward, said former being in sections and having portions to extend beneath and positively support the tray, means for moving said sections laterally after the tray is formed to release the tray, means for automatically closing said sections, and means for applying a protecting strip to the tray.

9. In an organized machine for forming trays, means for feeding the material, means for shaping an end thereof, means for giving shape to the tray, a former of sections having portions to extend beneath and positively support the tray and into which the shaped tray is forced downwardly, means for applying a protecting strip to the tray, and means independent of the shaping means for moving said sections laterally after the tray is formed to release the tray.

10. In an organized machine for forming trays, means for feeding the material, means for shaping an end thereof, means for giving shape to the tray, a former of sections having portions to extend beneath and positively support the tray and into which the shaped tray is forced downwardly, means for applying a protecting strip to the tray, means independent of the shaping means for moving said sections laterally after the tray is formed to release the tray, and means for automatically closing said sections.

11. In an organized machine for forming trays, means for feeding the material, means for shaping an end thereof, means for giving shape to the tray, a former in sections having portions to extend beneath and positively support the tray, means for delivering the protecting strip to the tray, means for affixing said strip to the tray, and means independent of the shaping means for automatically moving the sections of the former laterally after the tray is formed to release the tray.

12. In an organized machine for forming trays, a former, a plunger for coöperation therewith and a receiving former disposed beneath the first-named former and in position to receive the plunger and the shaped tray, said receiving former being composed of sections having portions to extend beneath and positively support the tray, and means for moving said sections laterally after the tray is formed to release the tray.

13. In an organized machine for forming trays, a former, a plunger for coöperation therewith and a receiving former disposed beneath the first-named former and in position to receive the plunger and the shaped tray, said receiving former being composed of sections having portions to extend beneath and positively support the tray, means for moving said sections laterally after the tray is formed to release the tray, and spring means for automatically returning said sections to their closed position.

14. In an organized machine for forming trays, a former, a plunger for coöperation therewith and a receiving former disposed beneath the first-named former and in position to receive the plunger and the shaped tray, said receiving former being composed of sections having portions to extend beneath and positively support the tray, means for moving said sections laterally after the tray is formed to release the tray, and spring means for automatically returning said sections to their closed position, said opening means being independent of the former and plunger.

15. In an organized machine for forming trays, a former, a plunger for coöperation therewith and a receiving former disposed beneath the first-named former and in position to receive the plunger and the shaped tray, said receiving former being composed of sections having portions to extend beneath and positively support the tray, means for moving said sections laterally after the tray is formed to release the tray, and spring means for automatically returning said sections to their closed position, said opening means being independent of the former and plunger and properly timed.

16. In an organized machine for forming trays, a plunger, a former for coöperation therewith, a receiving former in alinement with said former and plunger and comprising sections having portions to extend beneath and positively support the tray, means for applying a protecting strip, means for affixing the same, and automatic means for moving the sections of the former laterally after the tray is formed to release the tray.

17. In an organized machine for forming trays, a former, a plunger, a receiving-former in alinement with the plunger, a vertically movable die for bending a strip, means for supplying such strip to the edge of the tray, and means for pressing said strip down upon the edge.

18. In an organized machine for forming trays, a former, a plunger, a receiving-former in alinement with the plunger, a vertically movable die for bending a strip, means for supplying such strip to the edge of the tray, means for pressing said strip down upon the edge, and means for affixing the strip to the tray.

19. In an organized machine for forming trays, a former, a plunger, a receiving-former in alinement with the plunger, means for supplying a strip to the edge of the tray, means for pressing said strip down upon the edge, and means for affixing said strip to the tray, said affixing means being movable with said pressing means.

20. In an organized machine for forming trays, a former, a plunger, a receiving-former in alinement with the plunger, means for supplying a strip to the edge of the tray, means for pressing said strip down upon the edge, and means for affixing said strip to the tray, said affixing means being movable with said pressing means, said receivable former being in separable sections.

21. In an organized machine for forming trays, a former, a plunger, a receiving-former in alinement with the plunger, means for supplying a strip to the edge of the tray, means for pressing said strip down upon the edge, means for affixing said strip to the tray, said affixing means being movable with said pressing means, said receivable former being in separable sections, and means for automatically actuating said sections.

22. In an organized machine for forming trays, a former, a plunger, a receiving-former in alinement with the plunger, means for supplying a strip to the edge of the tray, means for pressing said strip down upon the edge, means for affixing said strip to the tray, said affixing means being movable with said pressing means, said receivable former being in separable sections, and means for automatically actuating said sections, the actuating devices for said several means being timed to automatically act in proper sequence.

23. In an organized machine for forming trays, a plunger, a receiving former in sections pivotally mounted to open laterally, an interposed former in alinement therewith, and a tray-receiving receptacle in alinement with said plunger and formers.

24. In an organized machine for forming trays, a plunger, a receiving former in sections pivotally mounted to open laterally, an interposed former in alinement therewith, a tray-receiving receptacle in alinement with said plunger and formers, and means for automatically actuating the sections of the receiving former.

25. In an organized machine for forming trays, a plunger, a receiving former in sections pivotally mounted to open laterally, an interposed former in alinement therewith, a tray-receiving receptacle in alinement with said plunger and formers, and means for automatically actuating the sections of the receiving former, the intermediate former being provided with means at opposite sides for supporting a blank.

26. In an organized machine for forming trays, a plunger, a receiving former in sections pivotally mounted to open laterally, an interposed former in alinement therewith, a tray-receiving receptacle in alinement with said plunger and formers, and means for automatically actuating the sections of the receiving former, the intermediate former being provided with means at opposite sides for supporting a blank and with blank-guiding means along one edge.

27. In an organized machine for forming trays, means for forming a tray in one machine embodying a plunger, a former of sections pivotally mounted to open laterally, an interposed former in alinement therewith, timed protecting strip supplying means for coöperation therewith and a tray-receiving receptacle in alinement with said plunger and formers.

28. In an organized machine for forming trays, means for forming a tray in one machine embodying a plunger, a receiving former in sections pivotally mounted to open laterally, an interposed former in alinement therewith, timed protecting strip supplying means, and pivotally mounted indenting means for indenting said strip into the edge of a tray.

29. In an organized machine for forming trays, means for forming a tray in one machine embodying a plunger, a receiving former in sections pivotally mounted to open laterally, an interposed former in alinement therewith, means for bending a strip, timed protecting strip supplying means for coöperation therewith, and indenting means for affixing said strip to the tray pivotally mounted for timed movement independent of said strip supplying means.

30. In an organized machine for forming trays, means for forming a tray in one machine embodying a plunger, a receiving former in sections pivotally mounted to open laterally, an interposed former in alinement therewith, means for bending a strip, timed protecting strip supplying means for coöperation therewith, means for pressing said strip on the edge of the completed tray, and means coöperating therewith for affixing said strip to the tray, said affixing means being mounted for timed pivotal movement independent of said strip supplying means.

31. In an organized machine for forming trays, a former having vertically disposed plates upon opposite sides of the opening therein for receiving and supporting the blank with recesses behind said plates for receiving the overlapped end portions of the material of the tray, the lower outer edges of said plate being chamfered.

32. In an organized machine for forming trays, a former having vertically disposed plates for receiving and supporting the blank, said plates having their lower outer edges chamfered.

33. In an organized machine for forming trays, a former having vertically disposed plates for receiving and supporting the blank with corner-receiving recesses between said plates and the adjacent walls of the former, the lower outer edges of said plate being chamfered.

34. In an organized machine for forming trays, the combination with the counterbalanced rocking means, and means in longitudinally disposed articulated sections pivoted to move in a vertical plane for supplying a protecting strip to the edge of the tray, and means coöperating with said rocking means for reciprocating the articulated means, of pivotally mounted means for pressing said strip down upon the edge of the tray, a receiving former in sections having portions to extend beneath and positively support the tray, and means for moving said sections laterally after the tray is formed to release the tray.

35. In an organized machine for forming trays, the combination with the counterbalanced rocking means, and means in longitudinally disposed articulated sections pivoted to move in a vertical plane for supplying a protecting strip to the edge of the tray, and means coöperating with said rocking means for reciprocating the articulated means, of pivotally mounted means for pressing said strip down upon the edge of the tray, and means carried by said pressing means for affixing the strip to the tray, a receiving former in sections having portions to extend beneath and positively support the tray, and means for moving said sections laterally after the tray is formed to release the tray.

36. In an organized machine for forming trays, the combination with the counterbalanced rocking means, and means in longitudinally disposed articulated sections pivoted to move in a vertical plane for supplying a protecting strip to the edge of the tray, and means coöperating with said rocking means for reciprocating the articulated means, of pivotally mounted means for pressing said strip down upon the edge of the tray, and means carried by said pressing means for affixing the strip to the tray, said affixing means being adjustable, a receiving former in sections having portions to extend beneath and positively support the tray, and means for moving said sections laterally after the tray is formed to release the tray.

37. In an organized machine for forming trays, a former in sections having portions to extend beneath and positively support the tray, a pusher in articulated sections mounted to have independent vertical movement, one of said sections having a shoulder and a die, a cam actuated counterbalanced rock shaft, and pivotal connections therewith for actuating the pusher and means for applying the strip to the tray.

38. In an organized machine for forming trays, a former in sections having portions to extend beneath and positively support the tray, a pusher in articulated sections mounted to have independent vertical movement, one of said sections having a shoulder and a die, a cam actuated counterbalanced rock shaft, pivotal connections therewith for actuating the pusher, and a reciprocatory female die for coöperation with said die and means for applying the strip to the tray.

39. In an organized machine for forming trays, a former in sections having portions to extend beneath and positively support the tray, a reciprocatory pusher in articulated sections mounted to have independent vertical movement, one of said sections having a shoulder and a die, a counterbalanced rock shaft, means thereon pivotally connected with the pusher, and means for rocking the shaft to actuate the pusher and means for applying the strip to the tray.

40. In an organized machine for forming trays, a former in sections having portions to extend beneath and positively support the tray, a reciprocatory pusher in articulated sections mounted to have independent vertical movement, one of said sections having a shoulder and a die, a counterbalanced rock shaft, means thereon pivotally connected with the pusher, means for rocking the shaft to actuate the pusher, and automatic means for returning the shaft to its normal position and means for applying the strip to the tray.

41. In an organized machine for forming trays, a former in sections having portions to extend beneath and positively support the tray, a pusher in articulated sections mounted to have independent vertical movement, one of said sections having a shoulder and a die, a link pivotally connected therewith, a counterbalanced rock shaft, an arm affixed to the shaft and pivotally connected with the link, and timed means for automatically actuating the shaft to move the pusher and means for applying the strip to the tray.

42. In an organized machine for forming trays, a former in sections having portions to extend beneath and positively support the tray, a pusher in articulated sections mounted to have independent vertical movement, one of said sections having a shoulder and a die, a link pivotally connected therewith, a rock shaft, an arm affixed to the shaft and pivotally connected with the link, timed means embodying a cam and coöperating roller for automatically actuating the shaft to move the pusher, and means for automatically returning the shaft to its normal position and means for applying the strip to the tray.

43. In an organized machine for forming trays, a former in sections having portions to extend beneath and positively support the tray, a pusher in articulated sections mounted to have independent vertical movement, one of said sections having a shoulder and a die, a link pivotally connected therewith, a rock shaft, an arm affixed to the shaft and pivotally connected with the link, timed means embodying a cam and coöperating roller for automatically actuating the shaft to move the pusher, and means for automatically returning the shaft to its normal position, combined with a reciprocating female die for coöperation with said die and means for applying the strip to the tray.

44. In an organized machine for forming trays, a former in sections having portions to extend beneath and positively support the tray, a rock shaft, a pusher in sections articulated to move vertically and connected therewith, a roller carried by said shaft, a cam mounted to engage said roller to rock the shaft and actuate said pusher, means for applying the strip to the tray and means coöperating with said pusher to affix a strip to the edge of the tray.

45. In an organized machine for forming trays, a former in sections having portions to extend beneath and positively support the tray, a rock shaft, a pusher in sections articulated to move vertically and connected therewith, a roller carried by said shaft, a cam mounted to engage said roller to rock the shaft and actuate said pusher, a counterbalancing weight connected with said shaft to return it to its normal position, means for applying the strip to the tray and means coöperating with said pusher to affix a strip to the edge of the tray.

46. In an organized machine for forming trays, a former, a plunger, a receiving-former in alinement with the plunger and openable laterally and downwardly, vertically movable dies for bending a strip, means for supplying such strip to the edge of the tray, means for pressing said strip down upon the edge of the tray, and means for affixing said strip to the tray.

Signed by me at Washington, D. C., this 29th day of Oct., 1909.

FREDERICK E. KUSTER.

Witnesses:
PERCY H. RUSSELL,
E. H. BOND.